(12) United States Patent
Doehring et al.

(10) Patent No.: US 7,107,793 B2
(45) Date of Patent: Sep. 19, 2006

(54) LITHIUM-ALUMINOSILICATE GLASS CERAMIC WITH HIGH KEATITE CONTENT AND STRUCTURAL MEMBER MADE THEREOF

(75) Inventors: Thorsten Doehring, Mainz (DE); Ralf Jedamzik, Griesheim (DE); Hauke Esemann, Woerrstadt (DE); Eva Hoelzel, Ober-Olm (DE); Ina Mitra, Stadecken-Elsheim (DE)

(73) Assignee: Schott AG, Mainz (DE)

( * ) Notice: Subject to any disclaimer, the term of this patent is extended or adjusted under 35 U.S.C. 154(b) by 167 days.

(21) Appl. No.: 10/638,823

(22) Filed: Aug. 11, 2003

(65) Prior Publication Data

US 2004/0070120 A1    Apr. 15, 2004

(30) Foreign Application Priority Data

Aug. 16, 2002 (DE) .................. 102 38 608

(51) Int. Cl.
*C03C 10/12* (2006.01)
(52) U.S. Cl. ............................ 65/33.9; 65/61
(58) Field of Classification Search ................ 65/33.8, 65/33.9, 61
See application file for complete search history.

(56) References Cited

U.S. PATENT DOCUMENTS

| | | | |
|---|---|---|---|
| 3,647,489 A | | 3/1972 | McMillan et al. |
| 4,011,091 A | * | 3/1977 | McCollister .................. 501/4 |
| 4,851,372 A | | 7/1989 | Lindig et al. .................. 501/4 |
| 5,446,008 A | * | 8/1995 | Krolla et al. .................. 501/68 |
| 5,922,271 A | * | 7/1999 | Semar et al. ................ 264/602 |
| 6,515,263 B1 | | 2/2003 | Mitra et al. .............. 219/443.1 |
| 2002/0023463 A1 | * | 2/2002 | Siebers et al. ............... 65/99.5 |
| 2004/0107731 A1 | * | 6/2004 | Doehring et al. ............... 65/81 |

FOREIGN PATENT DOCUMENTS

| | | |
|---|---|---|
| DE | 1 902 432 | 9/1970 |
| DE | 198 57 117 A1 | 6/2000 |
| DE | 199 39 787 A1 | 2/2001 |
| DE | 100 17 701 C2 | 10/2001 |
| DE | 102 26 815 A1 | 6/2002 |
| EP | 1 146 018 A1 | 10/2001 |
| EP | 1 170 264 A1 | 1/2002 |
| FR | 2 749 579 | 12/1997 |
| GB | 2 279 343 A | 1/1995 |

* cited by examiner

*Primary Examiner*—Sean Vincent
(74) *Attorney, Agent, or Firm*—Harness, Dickey & Pierce, P.L.C.

(57) ABSTRACT

A lithium-aluminosilicate glass ceramic is transformed by a suitable heat treatment into a glass ceramic comprising at least 80 vol.-% of keatite mixed crystals. This may be utilized for the preparation of optical or mechanical high-precision parts having a high temperature resistance, a good stability and compatibility with components consisting of metals having a small coefficient of thermal expansion based on nickel and iron, such as Invar®.

32 Claims, No Drawings

LITHIUM-ALUMINOSILICATE GLASS CERAMIC WITH HIGH KEATITE CONTENT AND STRUCTURAL MEMBER MADE THEREOF

BACKGROUND OF THE INVENTION

The invention relates to a lithium-aluminosilicate glass ceramic of a particular kind and to a method for preparing such a glass ceramic.

The invention further relates to a composite component comprising at least a first component of a lithium-aluminosilicate glass ceramic and at least a second component of a metal alloy having a low coefficient of thermal expansion.

The invention further relates to novel utilizations of a lithium-aluminosilicate glass ceramic.

Since years the applicant has successfully used Zerodur® glass ceramics as precision parts for optical and mechanical applications. The glass ceramic Zerodur® is a lithium-aluminosilicate glass ceramic that is prepared from a base glass of the system $Li_2O$—$Al_2O_3$—$SiO_2$, wherein by the addition of nucleation agents such as $TiO_2$ or $ZrO_2$ a controlled crystallization is effected (confer German examined application DE 1,902,432). In addition, from U.S. Pat. No. 4,851,372 a similar glass ceramic has become known which is marketed by the applicant under the mark Zerodur-M®.

These glass ceramics are prepared in several steps. After melting and hot forming usually the base glass is cooled to a temperature below the glass transition temperature. Thereafter the base glass is transformed into a glass ceramic article by controlled crystallization. This ceramization is performed by an annealing process having several steps in which in the beginning nuclei are formed by nucleation at a temperature between 600 and 800° C., usually from $TiO_2$ or $ZrO_2/TiO_2$ mixed crystals. Also $SnO_2$ may take part in the nucleation. During a subsequent raise of temperature high quartz mixed crystals grow on these nuclei at a crystallization temperature of about 750 to 900° C. Herein the volume fraction between the crystalline high quartz mixed crystal phase and the glassy phase can be controlled in such a way that a coefficient of thermal expansion of about 0 is reached. To this end normally a fraction of about 80 vol.-% high quartz mixed crystals to about 20 vol.-% residual glass is desired. By controlling the fraction between the crystalline phase of high quartz mixed crystals and the residual glass the characteristics may be adjusted within particular bounds.

However, the range of application of these glass ceramics is limited to about 600° C., while already between 130° C. and 300° C. particular restrictions exist.

In addition, it is known from U.S. Pat. No. 6,515,263, that glasses of the system $Li_2O$—$Al_2O_3$—$SiO_2$ may be transformed into glass ceramics (LAS glass ceramics) having high quartz mixed crystals and/or keatite mixed crystals as dominant crystals phases. If after nucleation in the range between 600° C. and 800° C. a further temperature increase until about 900 to 1200° C. is performed, then the previously formed high quartz mixed crystals further transform into keatite mixed crystals (U.S. Pat. No. 6,515,263). The transformation into keatite mixed crystals comes together with a crystal growth, i.e. an increase in crystal size, this leading to an increased light dispersion, i.e. light transmission is reduced at the same time. The glass ceramic article thereby has an increasingly opaque appearance. According to U.S. Pat. No. 6,515,263 a short-time temperature increase up to 1100° C. or more is performed, whereby the glass ceramic is transformed into a ceramic having predominantly a keatite mixed crystal phase in the core and having a high quartz mixed crystal phase close to the surface. These glass ceramics have a coefficient of thermal expansion smaller than $1.5 \times 10^{-6}$/K.

However, formed bodies prepared from such a glass ceramic up to now are merely utilized as components in series production. These formed bodies are utilized in transparent or opaque state as cooking surfaces or cooking utensils or as fire-proof glass, as fireplace glasses, cooking utensils or as windows for pyrolysis hearths. In particular, for the application as cooking surfaces, a coefficient of thermal expansion smaller than $1.5 \times 10^{-6}$/K is necessary, and a coefficient of thermal expansion of $0 \times 10^{-6}$/K is, preferably, desired during manufacture.

In addition, for particular applications composite components are desired which consist of a first component of a glass ceramic and of a second component of a metal. For instance, the glass ceramic component may have the necessary precision, shape precision and temperature stability, while the second component of metal is necessary to guarantee a precise mounting of the composite component and a stable connection technique.

In the manufacture of composite components of a ceramic or glass ceramic and of a metal the major problem normally rests in the differences between the coefficients of thermal expansion, since metals have a tendency to a coefficient of thermal expansion that is considerably higher than that of ceramics or glass ceramics.

SUMMARY OF THE INVENTION

Thus, it is a first object of the invention to disclose a glass ceramic that can easily be combined with a component made of a metal having a low coefficient of thermal expansion, such as Invar®.

It is a second object of the invention to disclose a glass ceramic offering a high temperature stability in excess of 600° C.

It is a third object of the invention to disclose a glass ceramic that is suitable for the manufacture of high-precision parts used for optical and/or mechanical applications.

It is a forth object of the invention to disclose a glass ceramic that is suitable for the manufacture of high-precision parts having superior characteristics when prepared with known glass ceramics, in particular having a good form stability, temperature stability and/or irradiation stability.

It is a fifth object of the invention to disclose a high-precision component made of a glass ceramic and having superior characteristics when prepared with known glass ceramics, in particular having a good form stability, temperature stability and/or irradiation stability.

It is a sixth object of the invention to disclose a method for the manufacture of such a glass ceramic or such a component.

It is a further object of the invention to disclose new applications of a lithium-aluminosilicate glass ceramic.

These and other objects of the invention are solved according to the invention by a component consisting of a lithium-aluminosilicate glass ceramic wherein the crystalline fraction consists of at least 80 vol.-%, in particular of at least 85 vol.-%, preferably of at least 90 vol.-% of keatite mixed crystals, and wherein the coefficient of thermal expansion is between $1.5 \times 10^{-6}$/K and $3 \times 10^{-6}$/K.

The object of the invention is completely solved in this way.

A component made of such a keatite glass ceramic offers, particularly advantageous characteristics due to the fact that it practically consists only of the stable keatite mixed crystal phase and that almost no high quartz residual phase is existent.

In particular such a component can be utilized at temperatures considerably above 600° C., namely up to about 1000° C. or even higher for short-time applications.

In addition, such a component offers a good irradiation resistance (i.e. for space applications). Also any hysteresis effect, such as known for instance with respect to the glass ceramic Zerodur®, does not occur.

Due to the higher coefficient of thermal expansion which is in the range of about $1.5 \times 10^{-6}$/K to $3 \times 10^{-6}$/K, but normally in the range of about $2.0 \times 10^{-6}$/K, such components can, in addition, be combined particularly advantageously with components consisting of alloys having a low coefficient of thermal expansion, such as Invar®. In this regard the differences between the coefficient of thermal expansion may be kept to $1 \times 10^{-6}$/K, preferably to $0.5 \times 10^{-6}$/K, in particular to $0.1 \times 10^{-6}$/K at the most, in the range between 0° C. and 250° C. Thereby, the connection technique is considerably simplified in this temperature range.

Surprisingly it has been found that the desired range of the coefficient of thermal expansion can be reached, in particular when utilizing an addition of 3 to 15 weight-% of $P_2O_5$ to the base glass. Fine adjustment can be made by the addition of $P_2O_5$ on the one hand or by the fraction of the keatite phase on the other hand.

In particular such components in which the crystalline fraction of the lithium-aluminosilicate glass ceramic is almost completely formed by keatite mixed crystals, due the higher stability of the keatite mixed crystal phase, new application fields are opened, i.e. applications as stages for micro-lithography applications, as mirrors, as spacers, as calibrating bodies or as precision reflectors in resonators of high-performance laser systems.

Since according to the invention keatite glass ceramic components are prepared by casting, also large components can easily be prepared, by contrast to sintered components.

The sintered glass ceramic also offers a good long-term stability and a high resistance against chemical environmental influences.

Suitable components of keatite glass ceramic may be prepared by the following steps:
  casting a lithium-aluminosilicate base glass into a mold;
    annealing for nucleation at a nucleation temperature of about 600 to 900° C.;
    annealing for the formation of a keatite glass ceramic at a keatite formation temperature of about 800 to 1300° C., until the crystalline phase has been transformed almost completely into keatite mixed crystals;
  cooling the glass ceramic component to room temperature.

Herein basically it is possible, after annealing at nucleation temperature, initially to anneal at a higher crystallisation temperature for crystallization, and to subsequently further increase the temperature, to transform the initially formed high quartz mixed crystals almost completely into keatite mixed crystals.

After casting of the base glass or after annealing for nucleation or crystallization, the body thus formed can initially be inspected in its transparent state for its inner quality (bubbles, inclusions, inhomogeneities, striae etc.), before the transformation into an opaque body is performed by a further annealing.

Alternatively, also initially a glass ceramic that comprises high quartz mixed crystals as the major crystal phase can be prepared by initially annealing at nucleation temperature and by subsequent annealing at crystallization temperature. Thus for instance from the base glass for the manufacture of Zerodur® glass ceramic, initially Zerodur® glass ceramic may be prepared which predominantly consists of the high quartz mixed crystal phase and that has a coefficient of thermal expansion close to zero. By a subsequent heating and annealing to the higher keatite formation temperature, the high quartz mixed crystals formed before can almost completely be transformed into keatite mixed crystals.

Alternatively, also it may be operated without any intermediate cooling steps, or after annealing for nucleation at a lower temperature in the region of about 650 to 850° C., immediately it can be heated to the higher temperature necessary for keatite formation (in the region of about 800 to 1300° C.).

Also a three-step process cycle is possible by annealing initially at nucleation temperature in the region of about 650 to 850° C., with a subsequent annealing at crystallization temperature in the region of about 750 to 900° C. (for forming the high quartz crystal phase), followed by an annealing at keatite formation temperature in the region between about 850 and 1300° C. for effecting transformation of the high quartz mixed crystals into keatite mixed crystals.

Annealing for keatite formation is preferably performed at least 900° C., preferably at least 1000° C., for at least one hour, in particular for at least two hours, particularly preferred for a duration of about three to four hours.

At a higher temperature the holding time may be shortened correspondingly.

According to the method according to the invention annealing for keatite formation is preferably performed at such a temperature and for such a time that the crystalline fraction is largely transformed into keatite. Preferably, herein at least 80 vol.-%, in particular about 85 vol.-%, and particularly preferred at least about 90 vol.-% of the crystalline fraction of the material are transformed into keatite mixed crystals.

Preferably, herein annealing is performed with a sufficient temperature and for a sufficient time, until the high quartz mixed crystal phase, which is not sufficiently stable, has almost completely been transformed into the stable keatite mixed crystal phase. At the most than a glassy residual phase may exist which may be enriched with high quartz mixed crystals and the insoluble ingredients, such as $Na_2O$ and alkaline earth oxides, such as CaO, SrO, BaO. However, preferably any possible residual glassy phase exists only in the form of inclusions which are dispersed within a microstructure predominantly consisting of keatite mixed crystals.

After completion of the heat treating the material usually comprises at least 80 vol.-% or even 85 vol.-% of keatite (fraction of the total volume).

By such a structure high form stability and temperature stability in the region of 550° C. to about 1000° C. is guaranteed. If a larger fraction of high quartz mixed crystal phase or glassy phase would be existent in the overall body, then the form stability and temperature stability at temperatures above 600° C. or at even higher temperatures could possibly be impaired.

According to a preferred development of the invention the glass ceramic component, after casting of the base glass and/or after annealing, is mechanically finished, in particular ground, polished or lapped.

In this way the necessary forming, surface characteristics and form precision can be reached by mechanical treatment (preferably with CNC controlled machines) by operations known in the art of glass processing.

As a base glass for the preparation of keatite glass ceramic components preferably a glass is utilized comprising the following components (in weight percent):

| | |
|---|---|
| $SiO_2$: | 50–75 |
| $Al_2O_3$: | 17–30 |
| $Li_2O$: | 2–8 |
| $B_2O_3$: | 0–5 |
| $P_2O_5$: | 0–15 |
| $SnO_2 + ZrO_2 + TiO_2$: | 0.1–7 |
| $Na_2O + K_2O + Cs_2O$: | 0–6 |
| $CaO + MgO + SrO + BaO + ZnO$: | 0–8 |
| refining agents such as $Sb_2O_3$, $As_2O_3$, $SnO_2$, $CeO_2$, sulfate or chloride compounds: | 0–3 |
| coloring oxides such as $V_2O_5$, $Cr_2O_3$, MnO, $Fe_2O_3$, CoO, NiO and other oxides: | 0–5. |

Herein preferably a base glass is utilized that comprises the following components (in weight percent):

| | |
|---|---|
| $SiO_2$: | 55–70% |
| $Al_2O_3$: | 19–25% |
| $Li_2O$: | 2.5–4.5 |
| $B_2O_3$: | 0–1 |
| $P_2O_5$: | 3–8 |
| $SnO_2 + ZrO_2 + TiO_2$: | 0.5–5 |
| $Na_2O + K_2O + Cs_2O$: | 0.1–3 |
| $CaO + MgO + SrO + BaO + ZnO$: | 0–5 |
| refining agents such as $Sb_2O_3$, $As_2O_3$, $SnO_2$, $CeO_2$, sulfate or chloride compounds: | 0–2 |
| coloring oxides such as $V_2O_5$, $Cr_2O_3$, MnO, $Fe_2O_3$, CoO, NiO and other oxides: | 0–2. |

With such a lithium-aluminosilicate base glass the desired predominant formation of a keatite phase in the keatite glass ceramic component can be obtained. Silicon oxide, aluminum oxide and lithium oxide are all necessary in the given range to effect some crystallization and a low thermal expansion. Preferably, boron oxide is not added at all or only in small amounts, since higher boron oxide contents are disadvantageous for crystallization. As a further component $P_2O_5$ may be added, in amounts of 0 to 15 weight percent, preferably between 3 and 8 weight percent, particularly, to allow a fine adjustment of the coefficient of thermal expansion. Mandatory is the addition of $ZrO_2$ or $TiO_2$ as nucleation initiators. Alternatively, or in addition, also $SnO_2$ may be added. The addition of the alkalis $Na_2O$, $K_2O$, $Cs_2O$ as well as the alkaline earths CaO, SrO, BaO improves the meltability and the deglassing characteristics of the glass during manufacture. MgO and ZnO act in a similar way. The glass ceramic may be prepared while adding common refining agents, such as e.g. $As_2O_3$, $Sb_2O_3$, $SnO_2$, $CeO_2$, sulfate or chloride compounds, such as NaCl. Also coloring oxides, such as $V_2O_5$, $Cr_2O_3$, MnO, $Fe_2O_3$, CoO, NiO and other oxides may be present in the given ranges.

Preferably, a composition may be utilized which corresponds to the known composition of Zerodur® or Zerodur-M® sold by the applicant. In addition, also other similar glass ceramics may be utilized as a base glass, such as Ceran®, Robax®, Clearceram®, Neoceram®, Astrositall®.

It will be understood that the above-mentioned and following features of the invention are not limited to the given combinations, but are applicable in other combinations or taken alone without departing from the scope of the present invention.

DETAILED DESCRIPTION OF THE PREFERRED EMBODIMENTS

Further features and advantages of the invention will become apparent from the following description of a preferred embodiment.

According to the invention a component consisting of a special keatite glass ceramic is disclosed that predominantly consists of keatite mixed crystals.

Such a component is prepared from a base glass by casting and is subsequently transformed by heat treating into a keatite glass ceramic predominantly consisting of a keatite mixed crystal phase.

The resulting coefficient thermal expansion of the keatite glass ceramic between 20° C. and 200° C. or even between 20° C. and 700° C. is in the range of about $1.5 \times 10^{-6}/K$ to $3 \times 10^{-6}/K$, however, preferably is about $2.0 \times 10^{-6}/K$.

Highly stable components can be reached even at large dimensions. Thus even diameters of eight meters at a thickness of 20 cm or more are achievable.

Glass ceramic components prepared according to the invention can directly be utilized, e.g. as temperature stable or irradiation resistant precision components, such as for satellite applications, or may be combined with metallic components consisting of alloys with a low coefficient of thermal expansion (such as Invar36® or the iron/nickel alloy 1.3912). In this regard a "low" coefficient of thermal expansion may be regarded as a coefficient of thermal expansion that is smaller than $3 \times 10^{-6}/K$, in particular smaller than $2.5 \times 10^{-6}/K$. The coefficient of thermal expansion of Invar36® in the range between 20° C. and 90° C. is about 1.7 to $2.0 \times 10^{-6}/K$, whereby a particularly good matching with the keatite glass ceramic according to the invention is reached.

Herein the combination with the metallic component may be reached by a clamping joint, by a screw connection, a positive fit connection, a frictional fit, or possibly by a shrink fit or a glued joint.

EXAMPLE

A base glass consisting of the following components (in weight percent) was molten:

| | |
|---|---|
| $SiO_2$ | 55.5 |
| $Al_2O_3$ | 25.3 |
| $P_2O_5$ | 7.90 |
| $Li_2O$ | 3.70 |
| $Na_2O$ | 0.50 |
| MgO | 1.00 |
| ZnO | 1.40 |
| $TiO_2$ | 2.30 |
| $ZrO_2$ | 1.90 |
| $As_2O_3$ | 0.50. |

This corresponds to a possible composition of the glass ceramic sold by the applicant under the trademark Zerodur®. The base glass manufactured in this way after refining was cast into a blank glass block and thereafter ceramized by controlled crystallization, while utilizing a temperature program. To this end initially heating up to 730° C. was performed at 0.1 K/min, 730° C. were maintained for a duration of 24 hours, subsequently heating up to 850° C. was performed at 0.1 K/min, this followed by a further holding at 850° C. for 48 hours, this followed by a slow cooling to room temperature at 0.1 K/min.

Depending on the size of the glass ceramic block this temperature profile must be adjusted accordingly to yield a high precision crack-free glass ceramic having a high quartz mixed crystal phase in the desired range.

From a glass ceramic block of predominant high quartz crystal phase manufactured in this way, a suitable blank part was cut out, mechanically processed at its surface and inspected for its quality.

Thereafter, heating up to 1000° C. was performed, e.g. at 4 K/min, followed by a holding at this temperature for a time of four hours, before a controlled cooling to room temperature was performed at 4 K/min.

The keatite glass ceramic component manufactured thereby was completely opaque and consists mainly of the stable keatite mixed crystal phase. Also only a small glassy residual fraction is existent. The component manufactured thereby can be mechanically processed, e.g. sawed, ground, lapped or polished, to reach the necessary shape and surface characteristics.

A component thus manufactured may, e.g., be combined by a positive fit connection with a component of Invar36®, to thereby prepare a composite component which may be utilized as a precision reflector in a resonator of a high-performance laser system. Herein, also the good remission characteristics are utilized apart from the good temperature stability of the material.

What is claimed is:

1. A method for the manufacture of a lithium-aluminosilicate glass ceramic comprising at least 70 vol.-% of keatite mixed crystals, the method comprising the following steps:
    casting a lithium-aluminosilicate base glass comprising (in wt.-%):

| | |
|---|---|
| $SiO_2$: | 50–75 |
| $Al_2O_3$: | 17–30 |
| $Li_2O$: | 2–8 |
| $B_2O_3$: | 0–5 |
| $P_2O_5$: | 3–15 |
| at least one of $SnO_2$, $ZrO_2$, and $TiOa_2$: | 0.1–7 |
| at least one of $Na_2O$, $K_2O$, and $Cs_2O$: | 0–6 |
| at least one of CaO, MgO, SrO, BaO, and ZnO: | 0–8 |
| at least one of refining agents: | 0–3 |
| at least one of coloring oxides and other oxides: | 0–5 | into a mold;
   annealing the base glass for nucleation at a nucleation temperature of about 600 to 900° C.;
   annealing for keatite formation at a temperature of 800 to 1300° C., wherein the temperature and the duration of annealing for keatite formation is selected so as to yield a glass ceramic comprising at least 70 vol.-% of keatite mixed crystals and having a coefficient of thermal expansion between $1.5 \times 10^{-6}$/K and $3 \times 10^{-6}$/K in the range between 20° C. and 700° C.; and
   cooling to room temperature.

2. The method of claim 1, wherein the annealing at keatite formation temperature is performed at such a temperature and for such a time that the glass ceramic comprises at least 80 vol.-% of keatite mixed crystals.

3. The method of claim 1, wherein said annealing for keatite formation is performed at least 950° C.

4. The method of claim 1, wherein said annealing for keatite formation is performed at least 1000° C.

5. The method of claim 3, wherein said annealing for keatite formation is performed for at least one hour.

6. The method of claim 3, wherein said annealing for keatite formation is performed for at least three hours.

7. The method of claim 1, wherein said annealing for keatite formation is performed at such a temperature and for such a time that the glass ceramic comprises at least 85 vol.-% of keatite mixed crystals.

8. The method of claim 1, wherein said annealing for keatite formation is performed at such a temperature and for such a time that the glass ceramic comprises about 90 vol.-% of keatite mixed crystals.

9. The method of claim 1, wherein the lithium-aluminosilicate glass ceramic after casting of the base glass and before annealing is cooled to room temperature and inspected for its quality.

10. The method of claim 1, wherein the lithium-aluminosilicate glass ceramic after casting of the base glass and before annealing is cooled to room temperature and mechanically worked.

11. The method of claim 10, wherein the mechanical working comprises at least one operation selected from the group formed by sawing, grinding, lapping and polishing.

12. The method of claim 1, wherein the lithium-aluminosilicate glass ceramic after annealing and cooling to room temperature is mechanically worked.

13. The method of claim 1, wherein after annealing for nucleation at nucleation temperature an annealing for crystallization is performed at a crystallization temperature which is higher than the nucleation temperature, and wherein a subsequent annealing for keatite formation is performed at a keatite formation temperature that is higher than the crystallization temperature.

14. The method of claim 13, wherein the nucleation temperature is in the range of 650 to 850° C., the crystallization temperature is in the range of 750 to 900° C., and the keatite formation temperature is in the range of 850 to 1300° C.

15. The method according to claim 1, wherein 3 to 8 wt.-% of said $P_2O_5$ is used.

16. A method for the manufacture of a lithium-aluminosilicate glass ceramic comprising at least 70 vol.-% of keatite mixed crystals, the method comprising the following steps:
    casting a lithium-aluminosilicate base glass comprising 3 to 15 wt.-% $P_2O_5$ into a mold;
    annealing the base glass for nucleation at a nucleation temperature of about 600 to 900° C.;
    annealing for keatite formation at a temperature of 800 to 1300° C., wherein the temperature and the duration of annealing for keatite formation is selected so as to yield a glass ceramic comprising at least 70 vol.-% of keatite mixed crystals and having a coefficient of thermal expansion between $1.5 \times 10^{-6}$/K and $3 \times 10^{-6}$/K in the range between 20° C. and 700° C.; and
    cooling to room temperature.

17. The method of claim 16, wherein the annealing at keatite formation temperature is performed at such a temperature and for such a time that the glass ceramic comprises at least 80 vol.-% of keatite mixed crystals.

18. The method of claim 16, wherein said annealing for keatite formation is performed at least 950° C.

19. The method of claim 16, wherein said annealing for keatite formation is performed at least 1000° C.

20. The method of claim 18, wherein said annealing for keatite formation is performed for at least one hour.

21. The method of claim 18, wherein said annealing for keatite formation is performed for at least three hours.

22. The method of claim 16, wherein said annealing for keatite formation is performed at such a temperature and for such a time that the glass ceramic comprises at least 85 vol.-% of keatite mixed crystals.

23. The method of claim 16, wherein said annealing for keatite formation is performed at such a temperature and for such a time that the glass ceramic comprises about 90 vol.-% of keatite mixed crystals.

24. The method of claim 16, wherein the lithium-aluminosilicate glass ceramic after casting of the base glass and before annealing is cooled to room temperature and inspected for its quality.

25. The method of claim 16, wherein the lithium-aluminosilicate glass ceramic after casting of the base glass and before annealing is cooled to room temperature and mechanically worked.

26. The method of claim 25, wherein the mechanical working comprises at least one operation selected from the group formed by sawing, grinding, lapping and polishing.

27. The method of claim 16, wherein the lithium-aluminosilicate glass ceramic after annealing and cooling to room temperature is mechanically worked.

28. The method of claim 16, wherein after annealing for nucleation at nucleation temperature an annealing for crystallization is performed at a crystallization temperature which is higher than the nucleation temperature, and wherein a subsequent annealing for keatite formation is performed at a keatite formation temperature that is higher than the crystallization temperature.

29. The method of claim 28, wherein the nucleation temperature is in the range of 650 to 850° C., the crystallization temperature is in the range of 750 to 900° C., and the keatite formation temperature is in the range of 850 to 1300° C.

30. The method according to claim 16, wherein said base glass comprises 3 to 8 wt.-% of $P_2O_5$.

31. A method for the manufacture of a lithium-aluminosilicate glass ceramic comprising keatite mixed crystals, the method comprising the following steps:
  casting a lithium-aluminosilicate base glass comprising 3 to 15 wt.-% $P_2O_5$ into a mold;
  annealing the base glass for nucleation at a nucleation temperature of about 600 to 900° C.;
  annealing for keatite formation at a temperature of 800 to 1300° C., wherein the temperature and the duration of annealing for keatite formation is selected so as to yield a glass ceramic comprising at least 50 vol.-% of keatite mixed crystals and having a coefficient of thermal expansion between $1.5 \times 10^{-6}$/K and $3 \times 10^{-6}$/K in the range between 20° C. and 700° C.; and
  cooling to room temperature.

32. The method according to claim 31, wherein said base glass comprises 3 to 8 wt.-% of $P_2O_5$.

* * * * *

UNITED STATES PATENT AND TRADEMARK OFFICE
CERTIFICATE OF CORRECTION

| | | |
|---|---|---|
| PATENT NO. | : 7,107,793 B2 | Page 1 of 1 |
| APPLICATION NO. | : 10/638823 | |
| DATED | : September 19, 2006 | |
| INVENTOR(S) | : Thorsten Doehring et al. | |

It is certified that error appears in the above-identified patent and that said Letters Patent is hereby corrected as shown below:

Column 7,
Line 49, "TiOa$_2$" should be -- TiO$_2$ --.

Signed and Sealed this

Thirteenth Day of February, 2007

JON W. DUDAS
*Director of the United States Patent and Trademark Office*